United States Patent [19]

Sato et al.

[11] Patent Number: 5,488,546
[45] Date of Patent: Jan. 30, 1996

[54] COLOR-CHANGING LAMP FOR VEHICLE

[75] Inventors: Osamu Sato; Toshihisa Hayami; Hideki Ohashi; Makoto Izawa; Tomoaki Serizawa; Hideki Uchida, all of Shimizu, Japan

[73] Assignee: Koito Manufacturing Co., Ltd., Tokyo, Japan

[21] Appl. No.: 337,854

[22] Filed: Nov. 14, 1994

[30] Foreign Application Priority Data

Nov. 22, 1993 [JP] Japan .................................. 5-315937

[51] Int. Cl.$^6$ .................................................. F21M 3/25
[52] U.S. Cl. ............................ 362/61; 362/293; 362/277; 315/77
[58] Field of Search ............................ 362/61, 277, 293, 362/255, 423; 315/77

[56] References Cited

U.S. PATENT DOCUMENTS 2,026,965  1/1936  Currah et al. ........................ 362/293
4,951,178  8/1990  Shirai et al. ........................... 362/61
5,180,224  1/1993  Svehaug ................................. 362/293

FOREIGN PATENT DOCUMENTS 3932216  4/1991  Germany ............................... 362/293
3-71502  3/1991  Japan ..................................... 362/293
3-37704  4/1991  Japan .

Primary Examiner—Ira S. Lazarus
Assistant Examiner—Sara Sachie Raab
Attorney, Agent, or Firm—Koda and Androlia

[57] ABSTRACT

In a color changing lamp equipped with a bulb 4 emitting a color of light, a glove with a different color from the color is selectively located on the covering position and exposure position of the bulb 4 in order to emit the different color of light. The current supply for the bulb 4 is stopped while the glove is selectively moved, thereby preventing different colors of light in a mixed state from being emitted on the way of exchange.

18 Claims, 8 Drawing Sheets

COLOR-CHANGING LAMP FOR VEHICLE

BACKGROUND OF THE INVENTION

The present invention relates to a color-changing lamp for use in a vehicle in which a light color is changeable, and more particularly to an improvement in which different colors of light is obtained in such a manner that a color globe is mated to or removed from a bulb.

Conventionally, as such a type of lamp, a headlight component has been proposed which is used as a headlamp with a light color of white or a foglamp with the light color of pale yellow changed. For example, in the lamp described in Unexamined Japanese Utility Model Application No. Hei. 3-37704, which has been previously proposed by the applicant of this application, with a reflector and a white bulb arranged within a lamp housing composed of a lamp body and a lens, the bulb emits white light during current supply. Further, with a pale yellow glove arranged within the lamp housing, a driving mechanism moves the glove between a position where the glove covers the bulb and another position where the glove is moved from the position. In the lamp having such a configuration, when the driving mechanism shifts the glove to the former position (hereinafter referred to as "covering position") where the glove covers the bulb, the light emitting from the bulb is colored in pale yellow when it passes through the glove so that it serves as a foglamp emitting pale yellow light. Further, when the driving mechanism shifts the glove forward from the covering position to the position (hereinafter referred to as "exposure position") where the bulb is not covered by the glove, the white light from the bulb emits, as it is, from the lamp so that the bulb serves as a headlamp emitting white light.

In the conventional color-changing lamp, the glove moves between the covering position and exposure position to change the light color. In this case, since the glove moves continuously between these positions by the driving mechanism, while the glove moves, the glove partially covers the bulb during a certain time period. Thus, in this state, the white light from the bulb and the pale yellow colored by the glove emit from the lamp, respectively so that the pale yellow light approximate to white, which results from mixture of these colors, will emit. Such a mixed color provides light with a hue other than the "white" and "pale yellow" stipulated in safety regulation. This is a problem when the conventional lamp is actually applied to a vehicle.

Further, where a vehicle has a plurality of color-changing lamps, there is a problem that a color difference occurs owing to fluctuation in operation timings for color changing by respective lamps.

SUMMARY OF THE INVENTION

In view of the problems accompanying the conventional color-changing lamp as discussed above, an object of the present invention is to provide a color-changing lamp for a vehicle capable of preventing light from emitting with a color which is not stipulated in safety regulation.

According to the present invention, a color-changing lamp is provided with a bulb having a first color and a glove having a second color which is different from the first color, the glove is driven to selectively locate at a covering position and an exposure position of the bulb so that the lamp emits light of different colors, and the current is not applied to the bulb while the glove is moving.

Since the bulb is kept being off state while the glove is moving to change color of the lamp, light with an undesirable mixed color is prevented from emitting from the lamp.

DESCRIPTION OF THE PREFERRED EMBODIMENTS

Preferred embodiments of the present invention will now be explained hereinbelow with reference to accompanying drawings.

Figure 1:
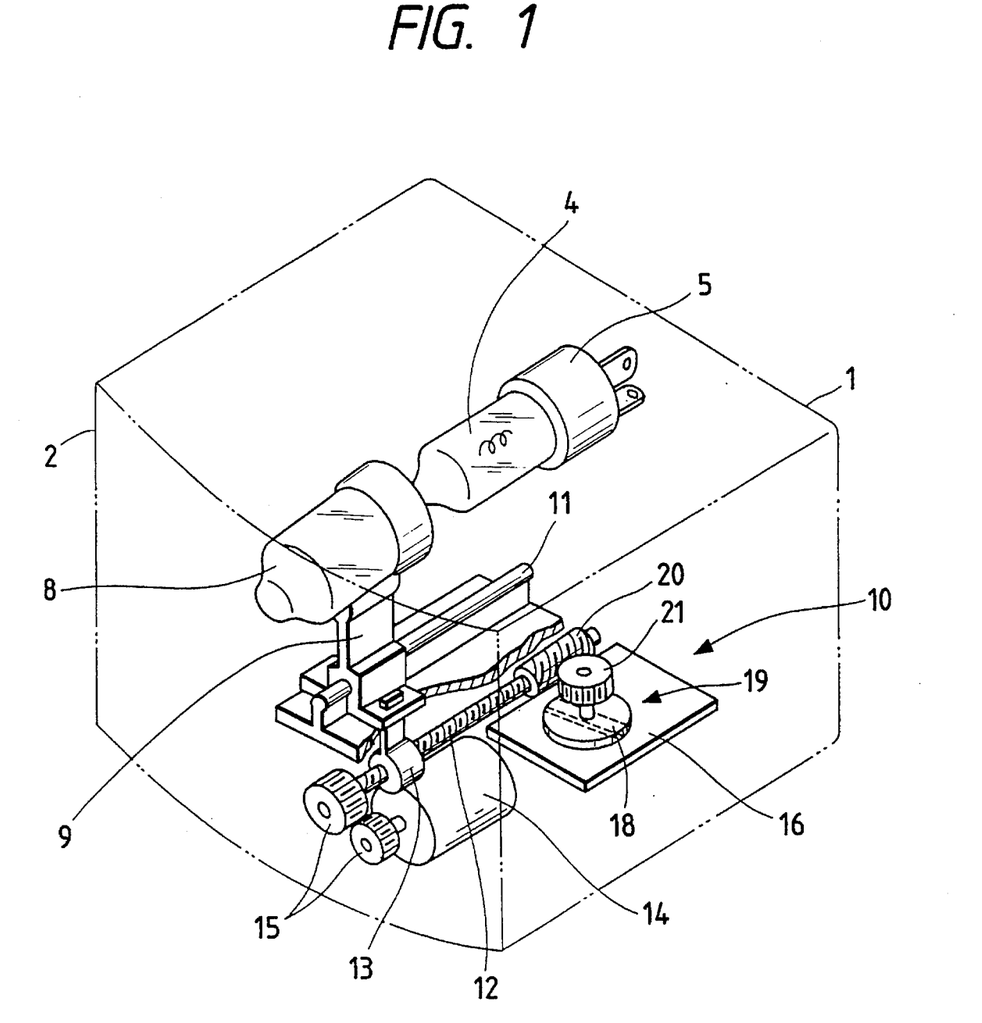
FIG. 1 is a perspective view showing the schematic of the foglamp according to the present invention.
Figure 2:
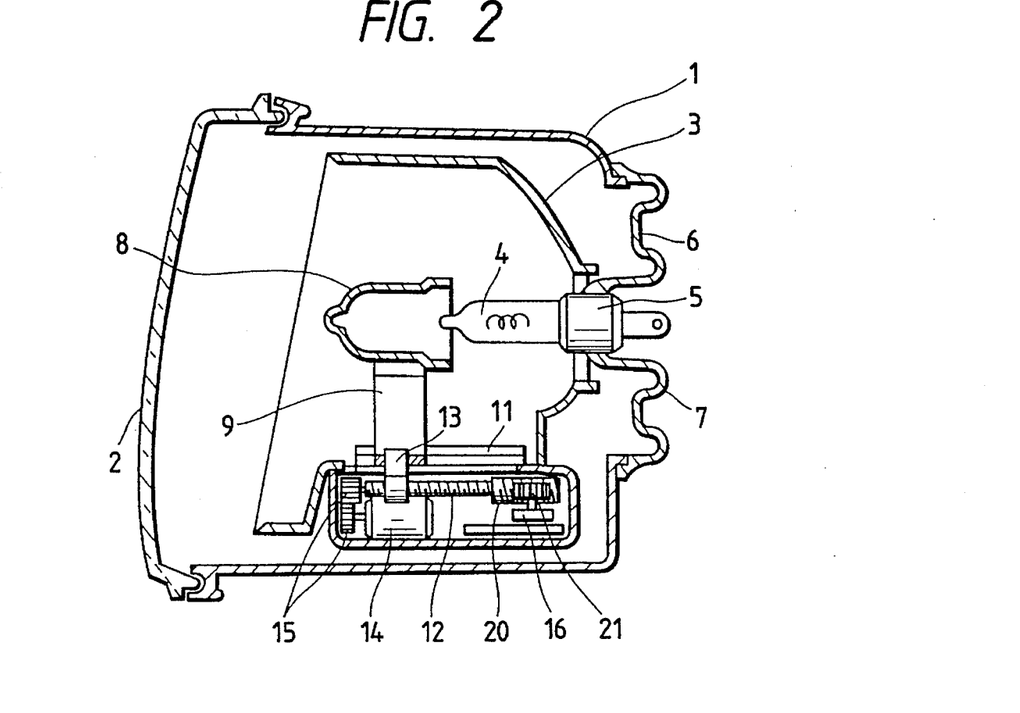
FIG. 2 is a side sectional view of FIG. 1.

FIG. 1 is a schematic perspective view of a color-changing lamp according to a first embodiment of the present invention in which the invention is applied to a foglamp which performs also as a white light headlamp of a vehicle. FIG. 2 is a side sectional view of the lamp shown in FIG. 1. This foglamp is provided with a lamp housing consisting of a lamp body 1 and an outer lens 2 formed of a white transparent resin coupled to a front opening of the housing. A reflector 3 is supported within the lamp housing 1. At the opening formed at the central position of the reflector 3, a bulb 4 inserted through a rear opening of the lamp body 1 is supported by a bulb socket 6. The rear opening of the lamp body 1 is sealed by a cover 7.

Within the lamp housing, a pale yellow cap-like glove 8 is arranged which is held by a glove holder 9 at the optical axis position on the front side of the bulb 4. The glove holder 9 engages, in its lower end, with a driving mechanism arranged at the lower side wall of the reflector 3. Specifically, the driving mechanism 10 has an extended rail 11 and a screw rod 12 in parallel to the optical axis of the bulb 4. The glove holder 9 is mounted on and supported by the rail 11 so as to be reciprocatable thereon. Further, a shifting piece 13 is screwed to the screw rod 12 so that it screw-slides in the longitudinal direction of the screw rod 12 when the rod 12 is axially rotated. The glove holder 9 integrally engages with the shifting piece 13 in its shifting direction.

Figure 3:
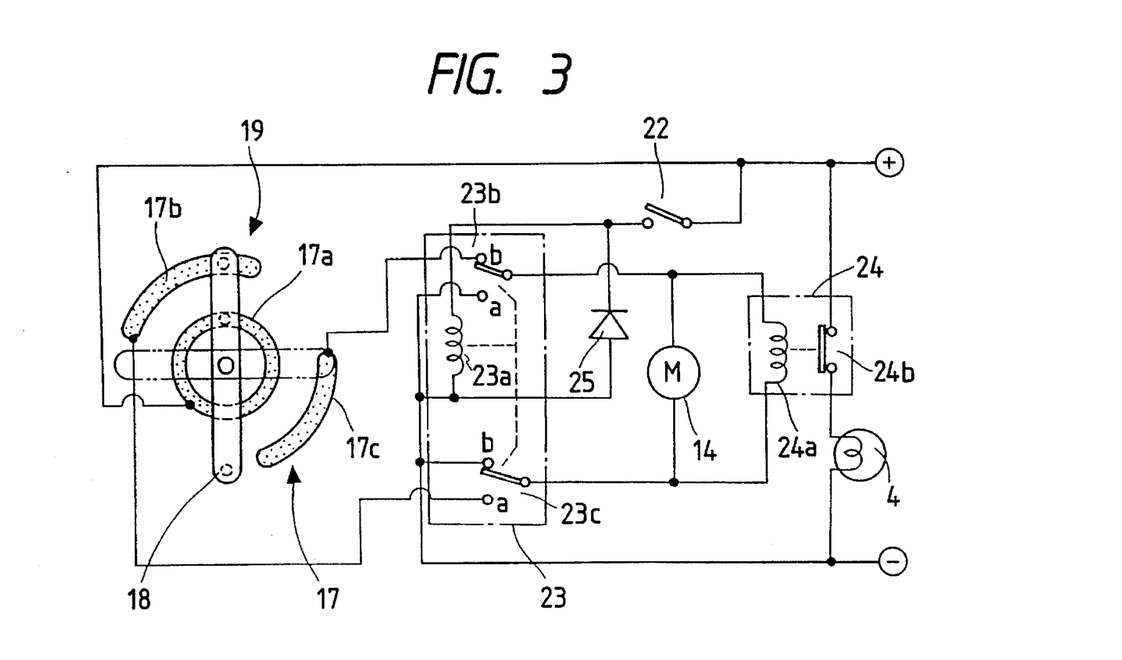
FIG. 3 is a circuit of one example of a control circuit.

The driving mechanism 10 has a driving motor 14. Gear wheels 15 attached to the driving motor 14 are in mesh with the screw rod 12 so that the screw rod 12 can be rotated by rotation of the driving motor 10. The driving mechanism 10 has a switch circuit substrate 16. As shown in FIG. 3, the switch circuit substrate 16 includes a switch circuit 19 composed of a fixed electrode 17 made of conductive foil and a rotating electrode 18 which rotates to electrically connect to or disconnect from the fixed electrode 17. The fixed electrode 17 is composed of an annular common electrode portion 17a and a pair of forward-rotation electrode portion 17b and backward-rotation electrode portion 17c which are opposite to each other in a radial direction and have a generally quarter arc-shape, respectively. Further, the rotating electrode 18 is adapted to be rotated by a partial output from a gear wheel 21 in mesh with a worm 20 which is integrally formed with the screw rod 12.

As shown in FIG. 3 which also illustrates the circuits connected to the respective electrodes 17 and 18 of the above switch circuit substrate 16, the switch circuit 19 is connected to a light-emitting-color exchanging switch 22, the driving motor 14, another light-emitting-color exchanging switch 23, an on-off relay switch 24 and the bulb 4. The light-emitting-color exchanging switch 22 is manually operated when the emitting color of a foglamp is changed into white or pale yellow; at "off", white is selected, and at "on", pale yellow is selected. With respect to the light-emitting-color exchanging switch 23, during no current flowing through a coil 23a, switch contacts 23b and 23c are connected to "b" sides as shown whereas during current flowing through the coil 23a, they are changed to "a" sides. With respect to the on-off relay switch 24, during current flowing through the coil 23a, its switch contact 24b is "on", and when current flows through the coil 23a, it is turned "off". The switch contact 24b is connected in series with the bulb 4 of the foglamp so that the "on" or "off" of the former turns "on" or "off" the bulb 4. Reference numeral 25 depicts a diode for preventing a backflow of current.

Figure 4A:
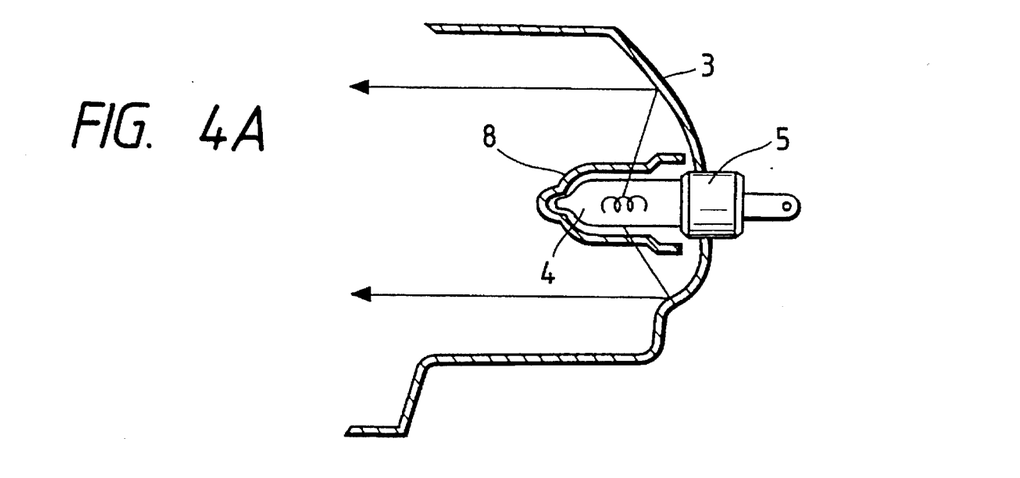
FIGS. 4A, 4B and 4C are views showing the emitting color of a foglamp and the moving position of a glove.

According to the foglamp having the above configuration, when the light-emitting-color exchanging switch 22 is "off", as shown in FIG. 4A, the glove 8 is located at the covering position for the bulb 4. So the white light when the bulb 4 comes on or illuminates is colored in pale yellow. The colored light is reflected by the reflector 3 and emitted from the lamp housing. Thus, the lamp functions as a foglamp emitting pale yellow light.

In order to change the light color in this state, when the emitting-light color exchanging switch 22 is turned on, the light-emitting-color exchanging switch 24 is energized so that the switch contacts 23b and 23c are exchanged into the a side. Then, the rotating electrode 18, as shown by solid line in FIG. 3, is in contact with the common electrode 17a and the forward-rotation electrode portion 17b. Power is therefore connected to the driving motor 14 in a forward direction so that the driving motor 14 starts to do the forward-rotation. Thus, the screw rod 12 is axially rotated in the forward direction through the gear wheel mechanism 15. The moving piece 13 screw-moves forward, and hence the holder 9 and glove 8 which are integral to the moving piece are also moved forward along the rail 11.

Figure 4B:
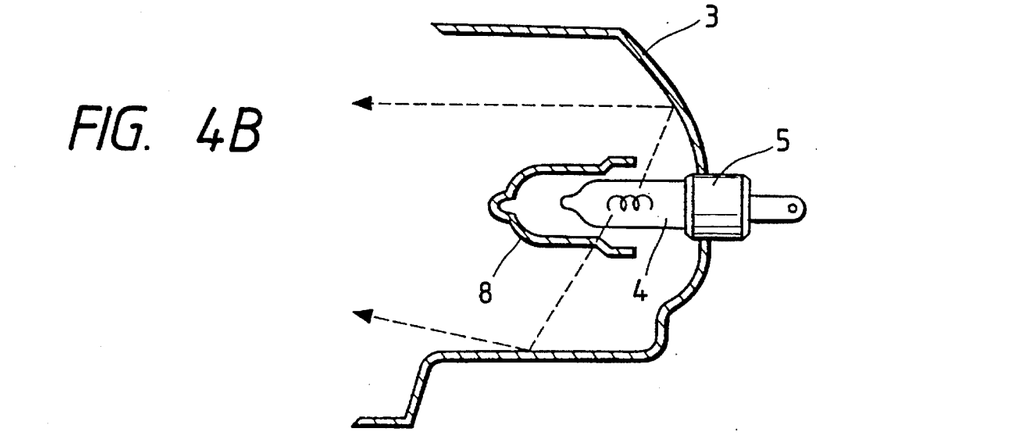
Figure 4C:
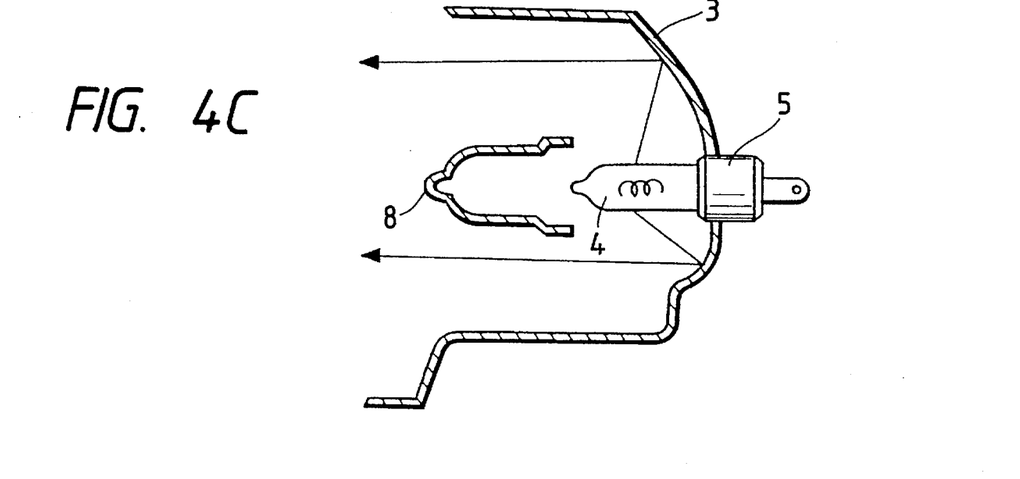

Further, rotation of the driving motor 14 rotates the rotating electrode 18 so as to slide on the forward-rotation electrode portion 17b. As shown in FIG. 4C, when the glove 8 moves to the exposure position for the bulb 4, in synchronism with this, the rotating electrode 18, as shown by dotted line in FIG. 4C, is moved to the position apart from the end of the forward-rotation electrode portion 17b. The disconnection of the rotating electrode 18 from the electrode portion 17b stops power supply to the driving motor 14 so that the rotation of the motor is stopped.

In this case, while the glove 8 moves, i.e., the driving motor 14 is driven, the on-off relay switch 24 connecting in parallel to the driving motor 14 is energized. So, in the on-off relay switch 24, the coil 24a is energized so that the switch contact 24b is turned "off". The turn "off" of the switch contact 24b turns off the power supply circuit for the bulb 4 so that the bulb 4 comes off. Thus, as shown in FIG. 4B, while the glove 8 is moving to cover the bulb partially, the foglamp remains off so that the light of the mixed color of white and pale yellow as shown by dotted line in FIG. 4B is prevented from being emitted from the lamp.

At the same time when power supply to the driving motor 14 is stopped, energization of the on-off relay switch is stopped. Then, the switch contact 24b is turned on so that power is supplied to the bulb 4 again and so the bulb comes on. In this state, the glove has been moved to the exposure position as shown in FIG. 4C. The white light emitting from the bulb 4 is therefore reflected by the reflector 3 and ejected from the lamp housing. Thus, the lamp light of the foglamp is white so that the lamp functions as a headlamp emitting white light.

Likewise, when the light-emitting-color exchanging switch 23 is turned off, the coil 23a of the light-emitting-color exchanging relay switch 23 becomes "off" so that the switch contacts 23b and 23c are exchanged into the b side. Then, the rotation electrode 18 is in contact with the common electrode 17a and reverse-rotation electrode portion 17c. The power is therefore reverse-connected to the driving motor 14 so that the driving motor 14 starts to rotate in the reverse direction. Thus, the screw rod 12 is axially rotated by the gear wheel mechanism 14, and the moving piece 13 is screw-moved toward the bulb 4. The holder 9 and glove 8 which are integral to the moving piece 13 are moved backward.

Further, rotation of the driving motor 14 rotates the rotating electrode 18 so as to slide on the reverse-rotation electrode portion 17c. As shown in FIG. 4A, when the glove 8 moves to the covering position for the bulb 4, in synchronism with this, the rotating electrode 18 moves to the end of the reverse-rotation electrode portion 17c. The disconnection of the rotating electrode 18 from the electrode portion 17c stops power supply to the driving motor 14 so that the rotation of the motor stops. In this state, as described above, the glove 8 completely covers the bulb 4 so that the light of pale yellow is emitted from the lamp.

Incidentally, while the glove 8 moves, the on-off relay switch 24 connected in parallel to the driving motor 14 is energized. So, the on-off relay switch 24 is energized so that the switch contact 24b is "off". The "off" of the switch contact 24b turns off the power supply circuit for the bulb 4 so that the bulb 4 comes off. When the glove 8 moves to the covering position and the driving motor 14 stops, energization of the turn-on/off relay switch 24 also stops simultaneously so that its switch contact 24b turns on. As a result, power supply to the bulb 4 is started again so that the bulb comes on. Thus, while the glove 8 is moving, i.e., the glove 8 covers the bulb 4 incompletely, illumination or come-on of the lamp 4 is avoided so that unlike the conventional art, the light of the mixed color of white and pale yellow is prevented from being emitted from the lamp.

Figure 5:
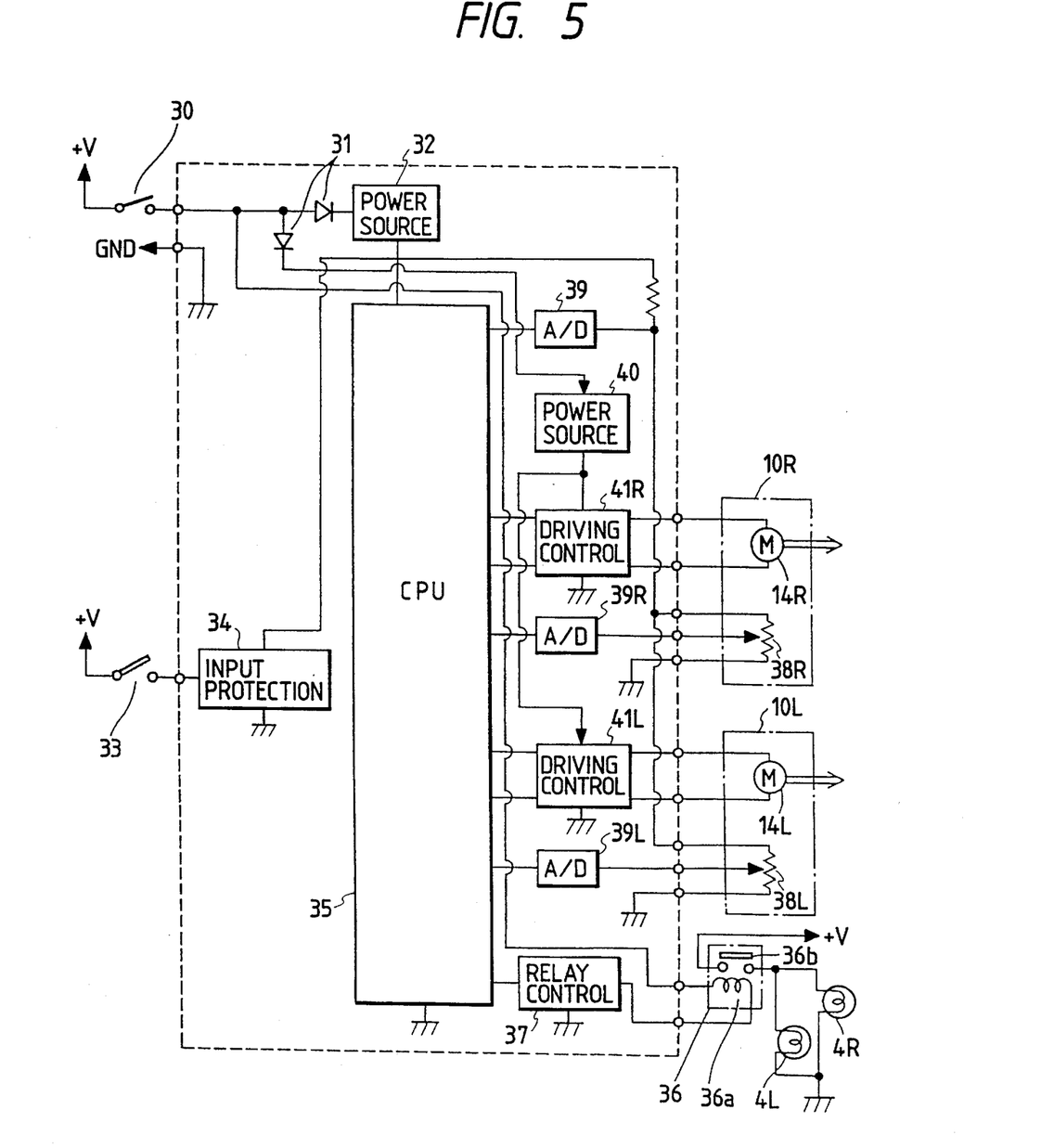
FIG. 5 is a circuit diagram of the control circuit according to the second embodiment of the present invention.

FIG. 5 is a block diagram showing the second embodiment of the present invention which is a circuit for controlling exchange of the glove and on/off of the bulb using a microcomputer (CPU). When a foglamp switch 30 is turned on, a power source which is incorporated in a vehicle is inputted through a protection diode 31. A power supply circuit 32 produces a voltage of 5 V for a CPU 35 from the voltage of the vehicle-incorporated power source. The on/off state of a light-emitting-color exchanging switch 33 is inputted to the CPU 35 as a signal having a predetermined level through an input protection circuit 34.

On the other hand, the respective bulbs 4R and 4L of right and left foglamps are connected to the power source through a switch contact 36b of a turn-on/off relay switch 36. Energization of the coil 36a of the turn on/off relay switch 36 is controlled by a relay control unit 37 which is in turn on-off controlled by the CPU 35. Further, driving mechanisms 10R and 10L for driving the gloves attached to the respective foglamps (R and L correspond to the foglamps on the right and left sides of a vehicle, respectively. This applies to the following description) are provided with driving motors 14R and 14L and potentiometers 38R and 38L for detecting the moving position of the gloves. The glove position, i.e., at which position of the covering position, exposure position or intermediate position for the bulb 4 (4R, 4L) the glove 8 is located as shown in FIG. 4A to FIG. 4C is detected in such a manner that the values of the potentiometers 38R and 38L are taken in the CPU 35 through A/D converters 39, 39R and 39L. A driving power source circuit 40 is provided which converts the power source voltage into the voltage to be supplied to the driving mechanisms 10R and 10L. Driving control circuits 41R and 41L supply the voltage from the driving power source circuit 40 to the driving motors 14R and 14L in a direction which is controlled in a forward direction or a backward direction by the CPU 35. The control by the CPU 35 rotates the driving motors 14R and 14L in the normal or reverse direction.

In this circuit, when the foglamp switch 30 is turned on, the power source circuit 32 and driving power source circuit 40 supply predetermined voltages to the CPU 35 and the driving control circuits 41R, 41L, respectively. Power is also supplied to the turn on/off switch 36. Then, for example, with respect to the foglamp on the right side, the CPU 35 detects the position of the glove, whether the glove is located at the covering position or exposure position, from the potentiometer 38 in the driving mechanism 10R. Further, the CPU 35 detects the on/off state of the light-emitting-color exchanging switch 35 and compares this state with the present position state of the glove. When both accord with each other, the CPU 35 controls the relay control unit 37 to be "on" so that the turn on/off relay switch 36 is energized to turn on its switch contact 37, thereby turning on the bulb 4b. Thus, the foglamp comes on. The lamp light color at this time is white or pale yellow in accordance with the position of the glove.

When the switching state of the light-emitting-color exchanging switch 33 and the present position of the glove detected from the potentiometer 38R do not accord with each other, the CPU 35 operates the driving control circuit 41R to rotate the driving motor 14R in a normal direction or reverse direction. This moves the glove. This movement state can be detected from changes in the value of the potentiometer 38R. The CPU 35 controls "the relay control unit 37 in an "off" state to stop the energization of the turn on/off relay switch 36. Thus, the switch contact 36b is "off" so that the current supply to the bulb 4R is stopped and so the bulb 4b remains off.

When the glove is moved to the covering position or exposure position and the position state of the glove by the potentiometer 38R accords with the state of the switching state of the light-emitting-color exchanging switch 33, the CPU 35 controls the driving control circuit 41R to stop the operation of the driving motor 14R. At the same time, the CPU 35 turns on the relay control unit 37 to turn on the turn on/off the switch contact 36b of the turn on/off relay switch 36, thereby illuminating the bulb 4R.

The above explanation entirely applies to the foglamp on the left side of a vehicle. In the second embodiment also, therefore, while the glove is moved to change the lamp light color, current supply is stopped to the bulb to keep the foglamp in an off state. Thus, the light of the mixed color of white and pale yellow can be prevented from being ejected.

Figure 6:
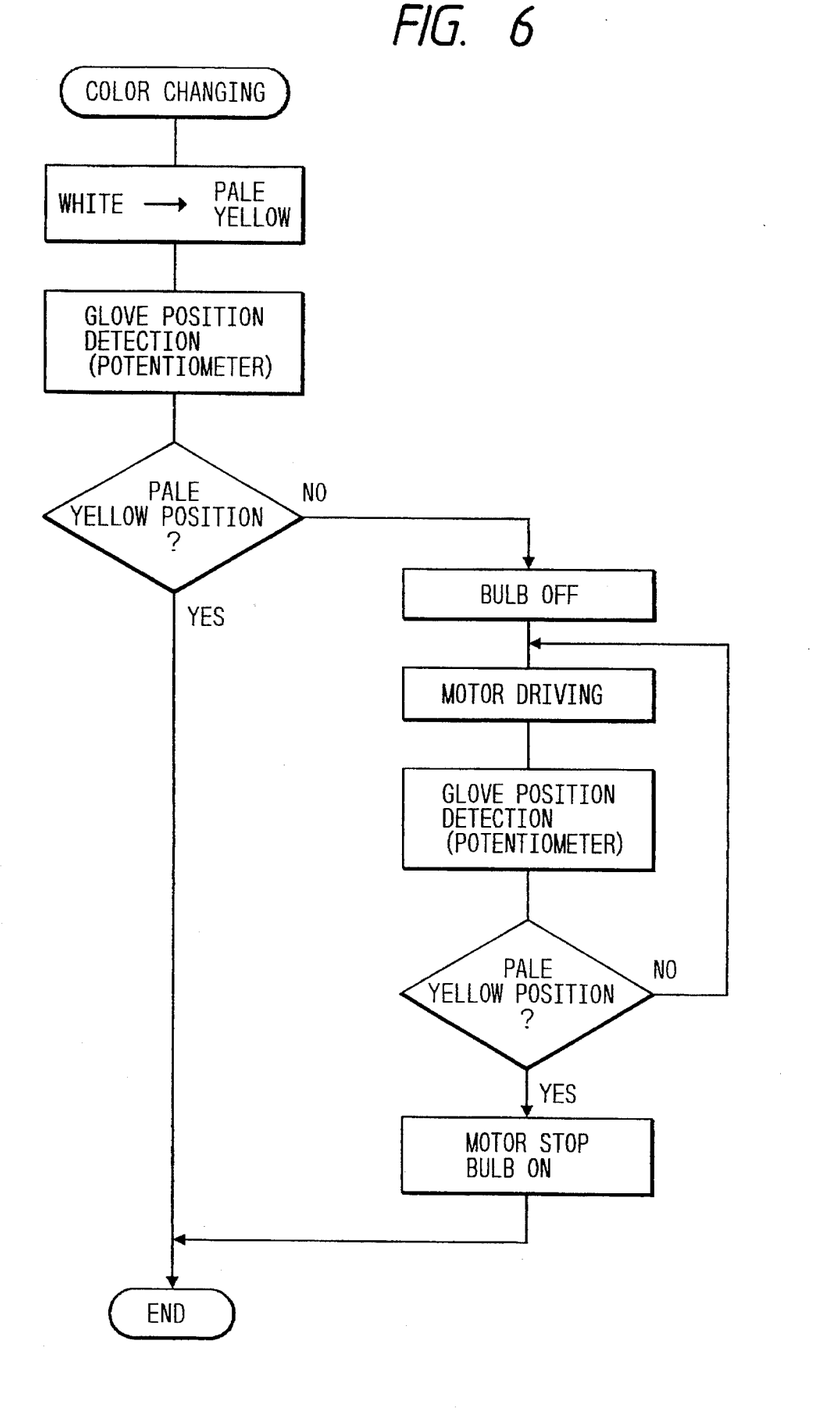
FIG. 6 is a flowchart for explaining the operation of the second embodiment.

FIG. 6 is a flowchart of the operation described above for a case where white light is changed into pale yellow. Incidentally, the timing of illuminating the bulb on the basis of the judgement of the color changing in the CPU 35 can be made slightly later than that of stopping the motor driving. This permits the bulb to come on with a slight time delay after the glove has been moved to the covering position or exposure position. Thus, it is possible to prevent the light emission of the mixed color due to the time error in the operation of moving the glove and detecting error for the position of the glove.

Figure 7A:
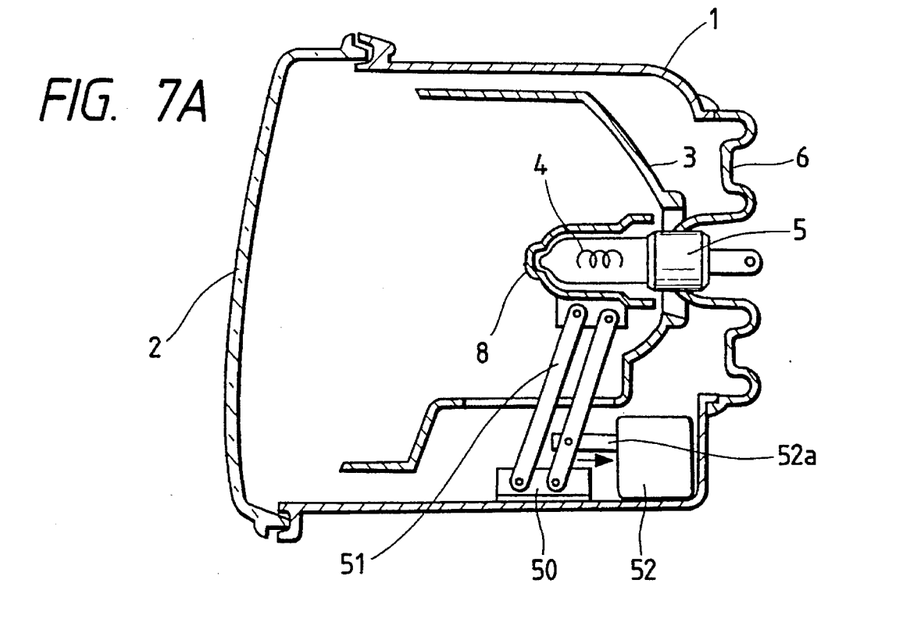
FIGS. 7A and 7B are a side sectional view of the foglamp according to the third embodiment of the present invention.
Figure 7B:
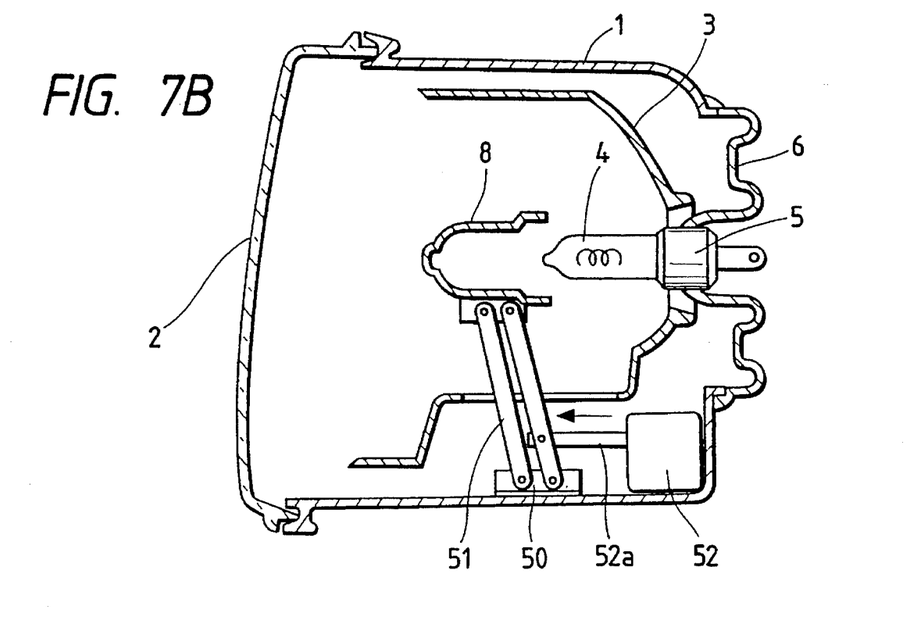

FIG. 7 is a schematic side view of the third embodiment according to the present invention. In FIG. 7, like reference numeral refer to like elements in FIG. 2. In the foglamp according to the third embodiment, a solenoid is used as a mechanism for driving the glove. Specifically, the glove 8 is supported through parallel links 51 on a supporting stand 50 within a lamp housing. A solenoid 52 is arranged on the bottom of a lamp housing and its armature 52a is linked with the parallel links 51. In operation, when a voltage is applied to the positive electrode of the solenoid 52, as shown in FIG. 7A, the armature 52a is retracted into the rear side of the lamp housing so that the glove 8 is moved backward, thereby moving the bulb 4 to the covering position. Thus, the foglamp is placed in state where pale yellow light is to be emitted. On the other hand, when a voltage is applied to the negative electrode of the solenoid 52, as shown in FIG. 7B, the armature 52a is projected toward the front of the lamp housing to move the glove 8 forward so that the glove 8 is moved forward by the parallel links 52, thereby exposing the bulb 4. Thus, the foglamp is placed in a state where white light is to be emitted.

Figure 8:
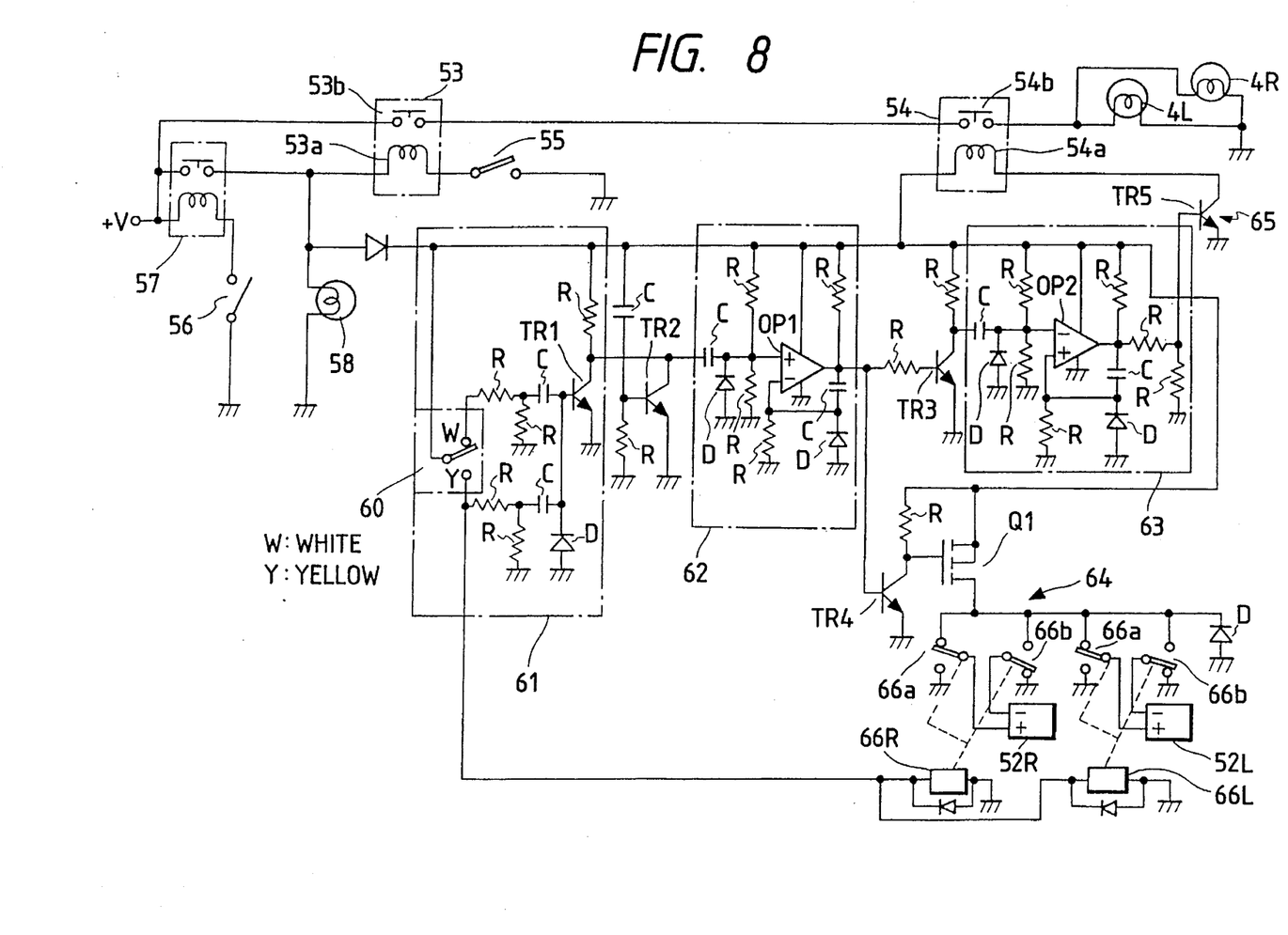
FIG. 8 is a circuit diagram of the control circuit according to the third embodiment of the present invention.

FIG. 8 shows a control circuit for the foglamp inclusive of the solenoid 52. As shown in FIG. 8, the circuit connecting bulbs 4R, 4L of right and left foglamps to a power source includes a series connection of the contact 53b of a foglamp relay switch 53 and the contact 55a of a foglamp switch 55. When the foglamp switch 55 turns on, the coil 53a of the foglamp relay switch 53 is energized. Then, the contact 53b is turned on to supply a current to the bulbs 4R and 4L, thereby turning on them. In the turn on/off relay switch 54, when the coil 54a is energized, the contact 54b is turned off to stop current supply to the bulbs 4R and 4L, thereby turning off them.

Further, the circuit connecting the foglamp switch 55 to the foglamp relay switch 53 is connected in series to a taillamp relay switch 57 whose contact turned on when a taillamp switch 56 is turned on. When the taillamp relay switch 57 is turned on, the taillamp 58 is turned on and the foglamps can come on. Then, the power source is also supplied to a light-emitting-color changing detecting circuit 61 for the foglamp which will be described later.

The above control circuit is composed of a light-emitting-color exchanging switch 60 for a foglamp, a light-emitting-color changing detection circuit 61 for detecting the switching state of the switch 60, a first timer circuit 62 for producing a pulse signal having a predetermined time width on the basis of the signal from the light-emitting-color changing detection circuit 61, a second timer circuit 63 for producing a pulse signal having a longer time width than the predetermined time width, a solenoid driving circuit 64 for supplying a current to the above solenoid 52 (52R, 52L) using the pulse signal from the first timer circuit 62, and a turn-on/off switch circuit 65 for supplying a current to the turn-on/off relay switch 54 using the pulse signal from the second timer circuit.

An explanation will be given for each of the above circuits. It should be noted that resistors, capacitors and diodes are generally shown by symbol R, C and D, respectively. The light-emitting-color changing detection circuit 61 is composed of resistors, capacitors and a transistor TR1. When the taillamp switch 56 is turned on, irrespectively of the changing state of the light-emitting-color exchanging switch 60, a differentiation circuit composed of the resistor and capacitor C on the side to which the light-emitting-color exchanging switch 60 is connected produces a differentiation signal which is amplified by the transistor TR1 to output a falling trigger signal. The first timer circuit 62 is constituted as a one-shot multivibrator composed of resistors R, capacitors C, diodes D and an operational amplifier OP1. In response to the trigger signal, the output from the first timer circuit 62 rises so that the circuit 62 produces a pulse signal having a predetermined time width t1. Likewise, the second timer circuit 63 is also constituted as a one-shot multivibrator composed of resistors R, capacitors C, diodes D and an operational amplifier OP2. The second timer circuit 63 is connected to the output from the first timer circuit 62 through a resistor R and a transistor TR3. In response to the trigger signal, the output from the second timer circuit 63 rises so that the second timer circuit 63 produces a pulse signal having a longer time width t2 (t2≧t1) than that of the pulse signal from the first timer circuit 62.

On the other hand, a pair of solenoid driving circuits 64 each having the same structure are provided correspondingly to the left and right foglamps. Each solenoid driving circuit 64 has a transistor TR4 which is turned on by the pulse signal from the first timer circuit 62 and a field effect transistor Q1 which applies the power supply voltage to the solenoids 52R and 52L when the transistor TR4 turns on. Light-emitting-color exchanging relay switches 66R and 66L are provided which are supplied with a current when the light-emitting-color exchanging switch 60 is switched to the pale yellow side. Through their contacts 66a and 66b, the positive and negative electrodes of the above solenoids 52R and 52L are connected to the field effect transistor Q1. The light-emitting color exchanging relay switches 66R and 66L, when they are supplied with a current, connect the positive electrodes of the solenoids 52R and 52L to the field effect transistor Q1, and when is supplied with no current, connect the negative electrodes of the solenoids 52R and 52L to the field effect transistor Q1.

The turn-on/off switch 65 has a transistor TR5 which is turned on by the pulse signal from the second timer circuit 63. When the transistor TR is turned on, the turn-on/off switch 54 is energized, and its contact 54b is turned off to stop current supply to the bulbs 4R and 4L for their turn-off so that the foglamps are turned off.

Figure 9:
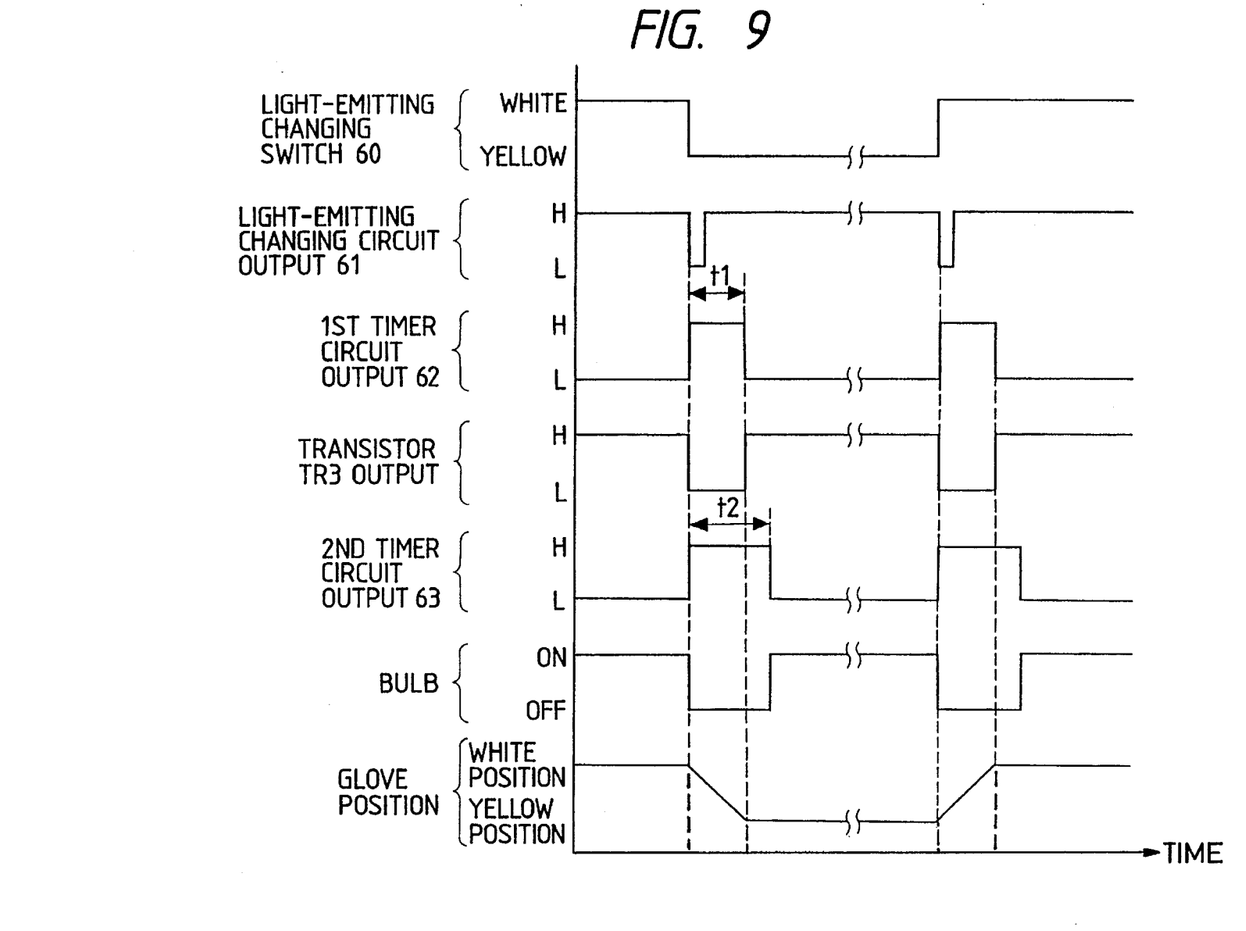
FIG. 9 is a timing chart for explaining the operation of the respective portions in the circuit of FIG. 8.

In this circuit, therefore, as shown in a timing chart of FIG. 9, with the taillamp 56 in the "on" state, the foglamp switch 55 is turned on to place the foglamp in the lighting state. In this state, when the light-emitting-color exchanging switch 60 is changed, the signal from the light-emitting color detection circuit 61 falls as a trigger signal through the transistor TR1. The trigger signal is supplied to the first timer circuit 62. At the same time, the output from the first timer circuit 62 rises to produce a pulse signal having a predetermined period. Further, simultaneously with the rise of the output from the first timer 62, the output from the transistor TR3 connected to the output side of the first timer circuit 62 falls as a trigger signal. The trigger signal is supplied to the second timer circuit 63. Likewise, a pulse signal having a predetermined period is produced from the second timer 63. When the light-emitting-color exchanging switch 60 is changed to the pale yellow side, the light-emitting-color exchanging relay switches 66R and 66L are energized, thus connecting the positive electrode sides of the solenoids 52R and 52L to the field effect transistor Q1. Therefore, when the transistor TR4 and field effect transistor Q1 are turned on by the pulse signal from the first timer circuit 62, a current is supplied to the positive electrodes of the solenoids 52R and 52L. Accordingly, as shown in FIG. 7A, the armature 52a is retracted backwards so that the glove 8 is shifted to the covering position for the bulb 4 (4R, 4L), thus leading to the state where the pale yellow light is emitted.

Simultaneously with the above operation, the transistor TR5 of the turn-on/off switch circuit 65 is turned on by the pulse signal from the second timer circuit 63. Thus, the turn-on/off switch 54 is energized so that its contact 54b is turned off to cause the bulbs 4R and 4L to come off. The "off" time continues until the glove is completely moved because the time width t2 of the pulse signal from the second timer circuit 63 is longer than the time width t1 of the pulse signal from the first timer circuit 62 which is supplied to the solenoid driving circuit 64. Therefore, the bulbs 4 will not illuminate on the way while the glove moves. This prevents the mixed light of white and pale yellow from being emitted.

When the light-emitting-color exchanging switch 60 is changed to the white side, the light-emitting-color exchanging relay switches 66R and 66L are not energized. So their contacts 66a and 66b connect the negative electrodes of the solenoids 52R and 52L to the field effect transistor Q1. Therefore, while a current due to the pulse signal from the first timer circuit 62 is supplied to the solenoid driving circuit 64, the current is supplied to the negative electrodes of the solenoids 52R and 52L. Thus, as shown in FIG. 7B, the armature 52a is projected forward so that the glove 8 is moved forward and the bulb 4 is released. Accordingly, the bulb 4 is placed in a white light emitting state. At this time, as described above, the bulb 4 remains off by the pulse signal from the second timer circuit 63.

In the third embodiment, the "off" time of the bulb can be set optionally. So if the bulb is illuminated after the glove has been surely moved, it is possible to prevent certainly the mixed color light from being emitted owing to a time error in the switching operation.

Incidentally, in the respective embodiments, although the present invention has been applied to the foglamp, it can be applied to other color changing lamp in a similar way.

As described above, in the present invention, while the glove with a different color from the bulb emitting a color of light is moved between the covering position and exposure position for the bulb, current supply for the bulb is stopped so that the bulb is "off". For this reason, it is possible to prevent the mixed color of light from being emitted during the period. As a result, it is possible to prevent the light of the other hue than the standard from being emitted.

What is claimed is:

1. A color-changing lamp comprising:

a bulb for emitting a first color of light;

a power source for energizing said bulb;

a glove formed of a light-transmissive material having a second color, said glove being disposed on an optical axis of said bulb;

a change-over switch for changing a position of said glove between a first position where said glove covers said bulb and a second position where said glove is in an exposure position for said bulb;

means for moving said glove between said first position and said second position, said glove moving means being operated in accordance with said change-over switch;

means for controlling a power supplying from said power source to said bulb, said power controlling means operatively engaging with said glove moving means and turning on said bulb when said glove is located at one of said first and second positions and turning off said bulb while said glove is moving between said first and second positions.

2. The color-changing lamp according to claim 1, wherein said means for controlling a power supplying comprises:

a switch means having a first position where an electric power is supplied to said bulb and a second position where said power is not supplied to said bulb; and an electrode means having a first electrode member electrically connecting to said power source, a second electrode member electrically connecting to said bulb and a rotating member for connecting and disconnecting between said first electrode member and said second electrode member, said rotating member being mechanically engaging with said glove moving means.

3. The color-changing lamp according to claim 2, wherein said first electrode member comprises an annular common electrode which always connects to said rotating member.

4. The color-changing lamp according to claim 2, wherein said second electrode member comprises a forward-rotation electrode for moving said glove forward in a direction of said optical axis and a reverse-rotation electrode for moving said glove backward.

5. The color-changing lamp according to claim 4, wherein said forward-rotation electrode and said backward-rotation electrode are opposite to each other in a radial direction and have a generally quarter arc-shape, respectively.

6. The color-changing lamp according to claim 2, wherein said switch means of said current controlling means comprises a relay switch.

7. The color-changing lamp according to claim 1, wherein said current controlling means comprises:

means for detecting a position of said glove; and a central processing unit connecting to said glove position detection means and to said bulb, said processing unit turning on said bulb when said glove is located at one of first and second positions thereof and turning off said bulb while said glove is moving between said first and second positions thereof.

8. The color-changing lamp according to claim 7, wherein said glove position detection means comprises a potentiometer.

9. The color-changing lamp according to claim 7, wherein said central processing unit of said current controlling means turning on said bulb a certain time after said glove reaches one of said first and second positions.

10. The color-changing lamp according to claim 1, wherein said means for controlling said power supplying comprises a timer means engaging with said change-over switch and a relay switch turning on and off said bulb in accordance with a signal of said timer means.

11. The color-changing lamp according to claim 10, wherein said timer means comprises a first timer circuit for producing a first pulse signal having a predetermined time width on the basis of a signal from said change over switch, a second timer circuit for producing a second pulse signal having a longer time width than said predetermined time width, and a driving circuit for supplying a current to said glove moving means using said first pulse signal from said first timer circuit, and a turn-on/off switch circuit for supplying a current to said relay switch using said second pulse signal from the second timer circuit.

12. The color-changing lamp according to any one of claim 1 or 2, wherein said glove moving means comprises:

a driving motor an extended rail;

a glove holder for holding said glove at the optical axis of said bulb, said glove holder being mounted on and supported by said extended rail so as to be reciprocatable thereon;

a screw rod in parallel to the optical axis of said bulb;

a shifting piece screwed to said screw rod so that said shifting piece screw-slides in a longitudinal direction of said screw rod when said rod is axially rotated, said shifting piece integrally engaging with said glove holder in said shifting piece shifting direction; and gear wheels attached to said driving motor and being in mesh with said screw rod so that said screw rod rotate by rotation of said driving motor.

13. The color-changing lamp according to any one of claim 1 or 10, wherein said glove moving means comprises:

a supporting stand secured onto a lamp body;

a link member pivotally engaging with said glove and said supporting stand; and a solenoid having an armature which is linked with said link member.

14. The color-changing lamp according to claim 1, wherein the lamp is a foglamp of a motor vehicle.

15. The color-changing lamp according to claim 1, wherein the lamp is a taillamp of-a motor vehicle.

16. The color-changing lamp according to claim 1, wherein said first color is white and said second color is pale yellow.

17. The color-changing lamp according to claim 1, wherein said first color is white and said second color is red.

18. The color-changing lamp according to claim 1, wherein said first color is white and said second color is amber.

* * * * *